United States Patent [19]
Jenkins et al.

[11] Patent Number: 5,948,047
[45] Date of Patent: Sep. 7, 1999

[54] DETACHABLE COMPUTER STRUCTURE

[75] Inventors: Michael D. Jenkins, Manassas; John F. Moynahan, Fairfax, both of Va.

[73] Assignee: Xybernaut Corporation, Fairfax, Va.

[21] Appl. No.: 08/705,247

[22] Filed: Aug. 29, 1996

[51] Int. Cl.[6] ................................... G06F 1/00
[52] U.S. Cl. .......................................... 708/141
[58] Field of Search .................... 395/733, 500, 395/2; 364/708-1, 188, 466; 367/681; 244/161; 708/141; 318/561; 701/50; 710/260

[56] References Cited

U.S. PATENT DOCUMENTS

| | | | |
|---|---|---|---|
| 4,556,944 | 12/1985 | Daniels et al. | 364/466 |
| 5,263,118 | 11/1993 | Cornelison | 395/2 |
| 5,264,992 | 11/1993 | Hogdahl et al. | 367/681 |
| 5,265,238 | 11/1993 | Canova, Jr., et al. | 395/500 |
| 5,305,244 | 4/1994 | Newman et al. | 364/708.1 |
| 5,372,340 | 12/1994 | Ihara et al. | 244/161 |
| 5,384,686 | 1/1995 | Mesfin et al. | 361/686 |
| 5,396,400 | 3/1995 | Register et al. | 361/686 |
| 5,579,528 | 11/1996 | Register | 395/671 |
| 5,625,829 | 4/1997 | Gephardt et al. | 395/800 |
| 5,627,974 | 5/1997 | Watts, Jr. et al. | 395/281 |
| 5,632,020 | 5/1997 | Gephardt et al. | 395/283 |
| 5,677,834 | 10/1997 | Mooneyham | 364/188 |
| 5,692,199 | 11/1997 | Kikinis et al. | 395/733 |
| 5,708,840 | 1/1998 | Kikinis et al. | 395/800 |
| 5,835,733 | 11/1998 | Walsh et al. | 395/281 |

FOREIGN PATENT DOCUMENTS 0 703 522A3  9/1995  United Kingdom ............. G06F 1/16

*Primary Examiner*—Joseph E. Palys
*Assistant Examiner*—Omar A. Omar
*Attorney, Agent, or Firm*—James J. Ralabate

[57] ABSTRACT

This structure is a stand alone or laptop computer that has a detachable hands-free mobile computer housed therein. The stand alone (or laptop) computer and the detachable hands-free mobile computer each can operate independent of or together with the other computer. Also each computer can communicate with the other during operation while connected or disconnected from each other.

8 Claims, 4 Drawing Sheets

DETACHABLE COMPUTER STRUCTURE

This invention relates to a computer system comprising a detachable unit and, more specifically, to a stand alone computer structure having therein a detachable mobile computer.

BACKGROUND OF THE INVENTION

In U.S. Pat. No. 5,305,244 (Newman et al), a hands-free, user-supported portable computer is disclosed. In Newman et al, this disclosed compact mobile computer is now commercially available from Xybernaut Corporation of Fairax, Va., successfully commercialized a under the registered trademark "Mobile Assistant®". U.S. Pat. No. 5,305,244 contains the specifics of the Mobile Assistant® in both construction and function; U.S. Pat. No. 5,305,244 and its disclosure is incorporated by reference into this disclosure. Also, U.S. patent application Ser. No. 08/538,194 filed on Oct. 2, 1995 and owned by the same entity as the present application, discloses further variations of the Mobile Assistant® including activation means other than voice activation means. The disclosure of Ser. No. 08/538,194 is also incorporated by reference into this present disclosure. In both U.S. Pat. No. 5,305,244 and U.S. patent application Ser. No. 08/538,194, a mobile, body-worn computer apparatus is disclosed having means for attachment of the computer and display to a user. The Mobile Assistant® is very lightweight, versatile and efficient and can be used in ways other stand alone or laptop computers may not be used.

Laptop computers are portable but not to the extent and versatility of the Mobile Assistant®; i.e. they are not intended to be worn and are not suitable for hands-free use as is the Mobile Assistant®. A laptop computer gives mobility to users who need to access, view, store, enter, manipulate and communicate information both as a stand alone system and as a remote computer communicating with other computer systems while away from their homes or offices.

While the term "laptop" will be used to define the base computer throughout this disclosure, it is intended that any computer such as another mobile computer, stand alone or stationary computers will be included as the "base computer" containing a detachable mobile computer (core computer). Also, the terms "stand alone" or "stationary computer" includes laptop, desktop or other suitable base computers.

To illustrate the use of the present invention, consider if an electric power company gives each of their field service technicians laptop computers configured with all standard components (processor, memory, non-volatile storage, etc.) including a 3.5 inch floppy disk for loading technical data received from manufacturers into their laptop computers. This is adequate if manufacturers distribute their technical information on 3.5 inch floppy disks. But what happens when the field service technician receives technical data for troubleshooting and repairing GE transformer equipment on CD-ROM? Since the technician's laptop only has a 3.5 inch floppy drive and not a CD-ROM reader, the technician would not be able to work on that manufacturer's type of transformer using that computer.

A solution provided by some laptop manufacturers gives the laptop owners the ability to mix and match the functionality of their laptop computers by allowing the swapping in and out of components. In the above example, the field service technician needs only to swap out the floppy disk drive and replace it with a CD-ROM drive to use the information provided by GE for repairing their transformer equipment. This solution is practical from a functionality point of view—the technician can now access needed technical information from the CD-ROM in the laptop. But what happens when the transformer is located at the top of a telephone pole and is only accessible to the technician by climbing the pole? A technician will eventually need to leave his laptop to work in an environment that prohibits carrying his computer even though the technician needs information from the computer.

This type of situation is common and it is when the most portable laptop computers cease to be useful. The need for a technician to be totally hands-free to perform a given function while simultaneously accessing, manipulating and viewing information contained on the laptop computer is imperative in these situations. Whether needing two hands for climbing a telephone pole, working on or carrying a component or maneuvering around or in an awkward device, handling or attempting to use a laptop while carrying out such acts is impractical and can be very dangerous.

The solution to this problem would be a system that would (1) function as a standard laptop (or other) computer, (2) provide all the basic components and ports, (3) operate in environments that are favorable (i.e. safe) to operating laptop or stationary computers and (4) when necessary, provide the ability to detach the "core" system, attach it to the technician's body and allow the technician to continue to operate in non-favorable situations with either a Head Mounted Display (HMD), other body-worn displays and/or speech recognition with confirmation or speech back only, speech input and/or output, and other types/means. Thus, a solution would be to provide a two-in-one structure containing a laptop and a detachable unit that can be used as a body-worn hands-free computer of the type described in U.S. Pat. No. 5,305,244.

SUMMARY OF THE INVENTION

It is therefore an object of this invention to provide a computer structure devoid of the above-noted disadvantages.

Another object of this invention is to provide a computer that has the ability to operate in any environment.

Still a further object of this invention is to provide a computer that has all of the advantages of a laptop or conventional, stationary computer with the added advantage of a detachable mobile/wearable computer.

Yet a further object of this invention is to provide a computer that provides maximum functionality and mobility to the user.

A further object of this invention is to provide a computer structure that can easily be converted into two separate function computers, one being a mobile/wearabale computer.

These and other objects of this invention are accomplished by a laptop computer (or other base computer) comprising a detachable self-contained mobile computer unit that has means to fully function apart from said laptop computer. By "self-contained" is meant throughout this disclosure and claims a general purpose computer with conventional computer components but also has built in capacity to interface with external sources of data and information. Said mobile computer unit comprises in combination all of the components of a conventional general purpose computer. The mobile computer unit has means for attachment to a user's body as disclosed in U.S. Pat. No. 5,305,244 with the required body or head display means.

The computer optionally has means to permit full functioning of both the base computer and mobile computer even after said mobile computer unit is detached from the base computer.

This invention is designed to give maximum functionality and mobility to computer users who, during the normal course of their day, have a need to be totally hands-free and still access information while in environments that are not suitable for laptop computers but who may also need to access data in their vehicles or from their desktops in a conventional fashion. "Activation" means that may be used for the mobile computer of this invention include voice activation, eye-tracking, brain activation and pen activation, all of which are described in detail in the co-pending application Ser. No. 08/538,194. In addition, activation means such as mouse activation (conventional) or any other suitable activation means or mixtures of activation may be used with mobile computer of this invention.

Implementation of this invention in an embodiment includesn three forms. First, the core unit could be designed so that the removable mobile computer has all the standard features of the current Mobile Assistant® minus display and power means such as the system disclosed in Ser. No. 08/538,194. Standard features include a processor, memory, internal non-volatile storage, activation means, video display controller, PC Card slots with associated circuitry, external video connector as well as serial, parallel, keyboard, battery and HMD (head mounted display) connectors. Using the system of this invention would amount to the user disconnecting/undocking the mobile device from the laptop docking unit (base unit), mounting the mobile device on the user, attaching both a battery and the head-mounted display system and continuing to work. The abililty to dock or undock the core or mobile computer from the base computer enclosure while it is running (i.e., hot docking) or while the core computer is in suspend or standby mode (i.e., warm docking) may be provided as a matter of convenience.

In a second embodiment, the core or mobile unit attaches or docks to an enclosure and the enclosure contains all peripheral connector ports including the PC Card housing. This design has several benefits. First, because some of the external connectors are located on a separate docking device, the "core computer" size can be minimized. Secondly, this design provides maximum flexibility for developing special enclosures for different applications (e.g. medical equipment testing, inventory, etc.) without the need for modifying the core computer unit. This is especially useful because the enclosures can then be built directly into any environment, i.e. cars, homes, etc. Again, this embodiment may also provide the hot/warm docking capability.

In a third embodiment, the core unit's size is minimized even more by removing all peripheral I/O component circuitry and related connectors (such as the video display controller, PC Card controller, etc.) and having the peripheral circuitry and related connectors embedded directly into other enclosures. In this instance the "core unit" comprises the processor, memory, non-volatile storage, keyboard controller, power connector, and support circuitry. This design also provides several benefits. First, because all peripheral component circuitry is removed from the core unit, the core unit's size is reduced even more than that of the above described second embodiment. Second, all I/O peripheral support circuitry and related connectors are now embedded within other enclosures, the core unit is thereby capable of driving all external components to their highest capabilities, and also provides the capability for system integrators/designers to develop application specific systems based not only on user requirements, but can limit the functionality of the system.

Finally, by developing and using this type of architecture, the number of software licenses a person or company needs can be reduced significantly. Since the core unit which contains the license software stored on non-volatile storage will always travel with the user, there would be no need for multiple software licenses (one for the office desktop, one for the laptop, and one for the Mobile Assistant®), thus minimizing software costs. This aspect is true for all disclosed embodiments.

In another embodiment of this invention, means are provided to remove the monitor and keyboard from the laptop and use these as the display means and activation means or in conjunction with other activation means, for the Mobile Assistant®. This provides monitor advantages not usually found in a head set display such as color capability, higher resolution and availability for group viewing.

In a further embodiment of this invention, when the mobile computer is removed, the remaining base computer may be a shell devoid of substantially all of the computer working components. Conversely, the removable mobile computer may be a shell devoid of substantially all of the computer working components. In both these embodiments wireless or other communication means may be used to operate the shell computer.

DETAILED DESCRIPTION OF THE DRAWING AND PREFERRED EMBODIMENTS

Figure 1:
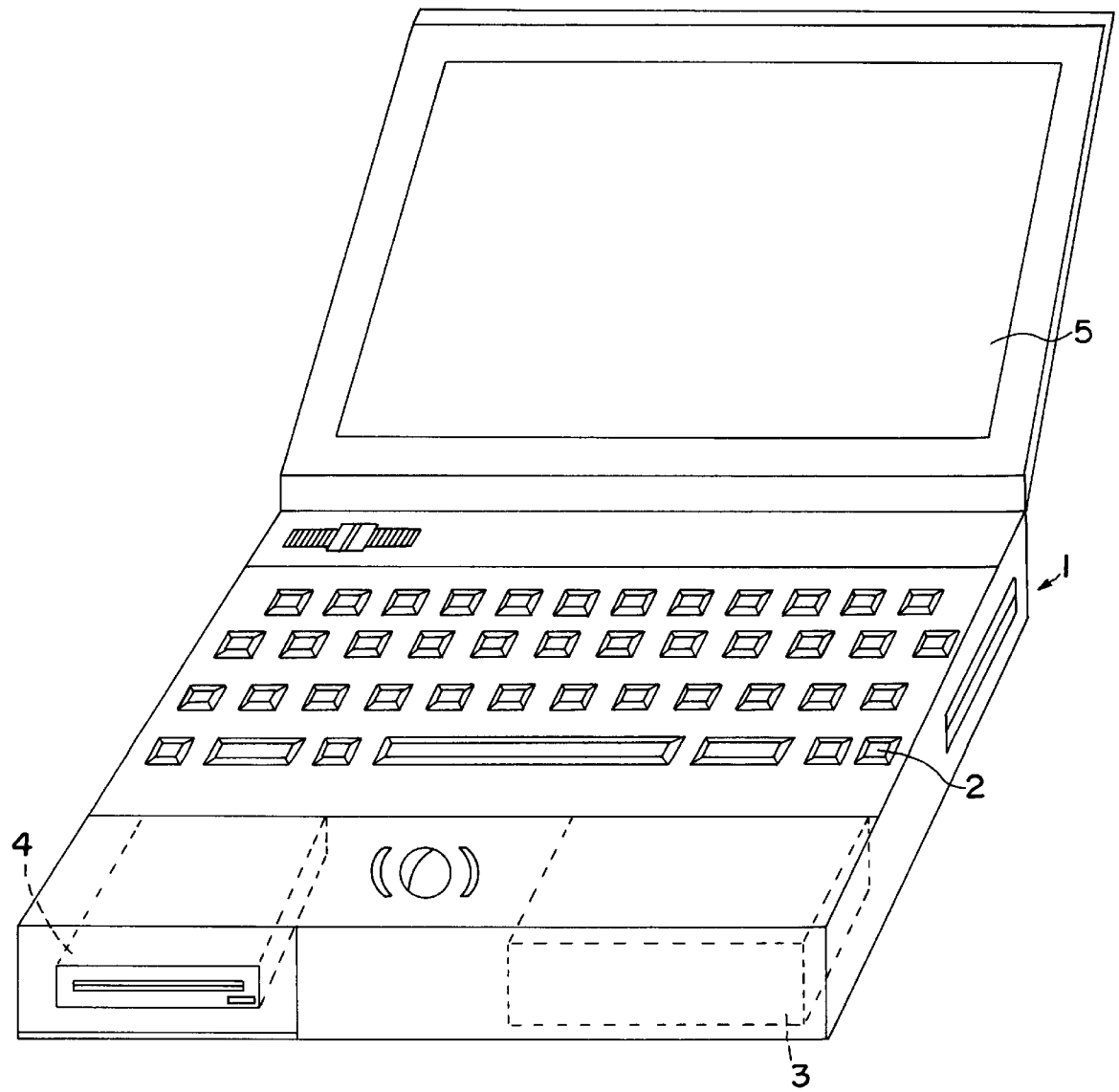
FIG. 1 is a front top plan view of a standard or conventional prior art laptop computer.

In FIG. 1, a prior art laptop computer 1 is illustrated having a keyboard 2, an internal non-volatile storage 3, a floppy drive 4 and a display screen 5. The construction and function of this prior art laptop device is well known in the art as disclosed in various publications.

Figure 2:
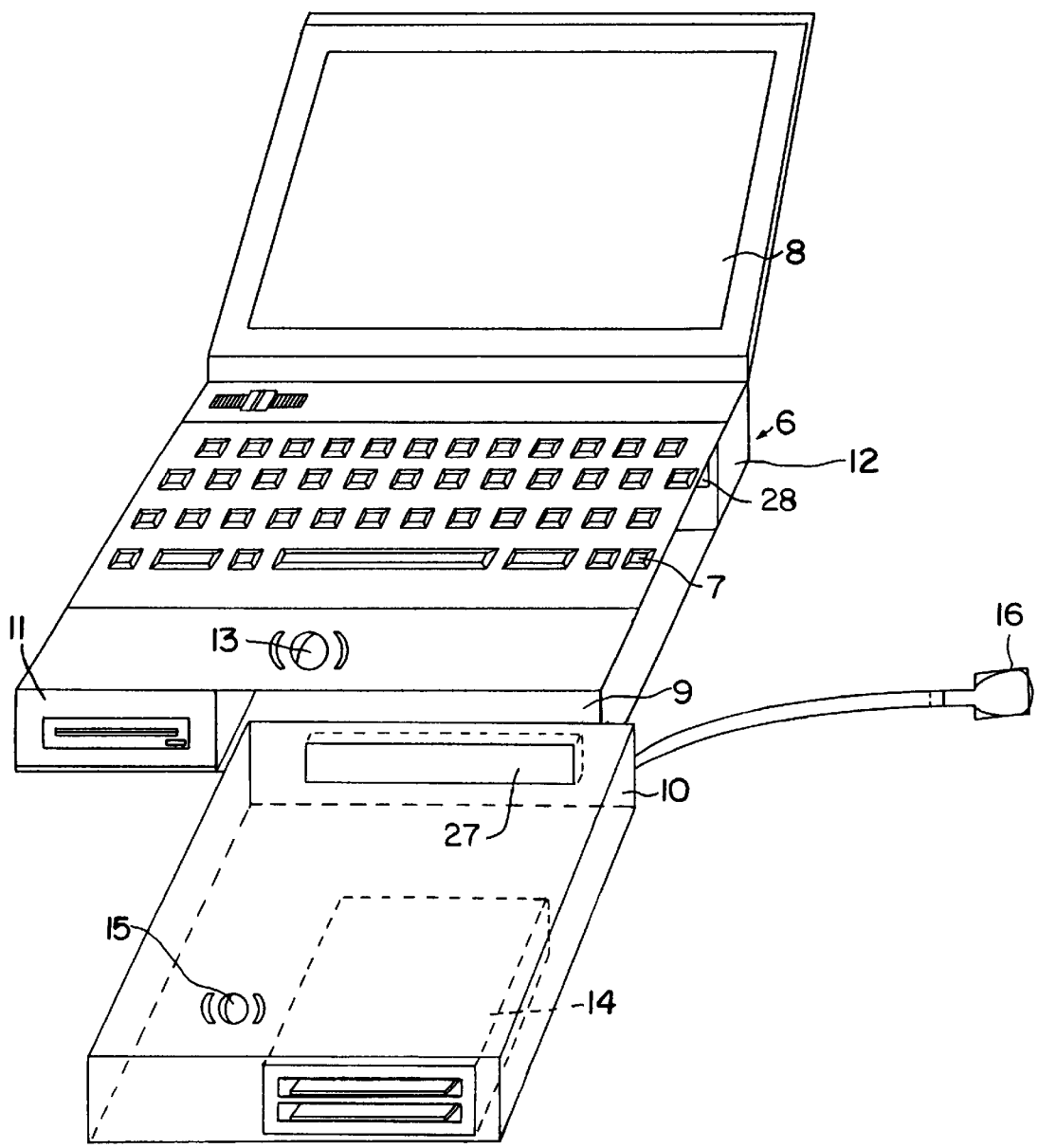
FIG. 2 is a front top plan view of an embodiment of a laptop computer of this invention with the removable or detachable (mobile computer) Mobile Assistant® unit minus the head set and power means.

In FIG. 2, a bas e computer 6 (in this case a laptop) is shown having the usual laptop components such as keyboard 7, viewing screen 8 and housing 9 for Mobile Assistant® 10. It is important to note here that base computer can either function independently from Mobile Assistant® 10 or it can function off the components of and rely upon Mobile Assistant® 10. In a preferred embodiment, both computer 6 and Mobile Assistant® 10 can function independently of each other and can communicate with each other when separate. Monitor 8 can be stationary or can be removable to be used as a display for the removed Mobile Assistant® 10. Some of the components of the laptop and Mobile Assistant® can in some embodiments be shared components such as the keyboards, monitor 8, floppy drive 11 and power source 12. Also the laptop can rely upon the Mobile Assistant® for the PCMCIA 14 (other suitable means are included in the term "PCMCIA"). Voice, eye-tracking, pen activation or brain activation means 16 may be used (as described in Ser. No. 08/538,194) to activate mobile computer 10. Also mouse activation means 13 can be used to activate the laptop computer and mobile mouse activation means 15 may be used to activate the mobile computer 10 of this invention. Extension 27 is an electrical connector which fits into and mates with electrical opening 28 to provide communication means for computer 10 with computer 6 when computer 10 is in housing 9.

Figure 3:
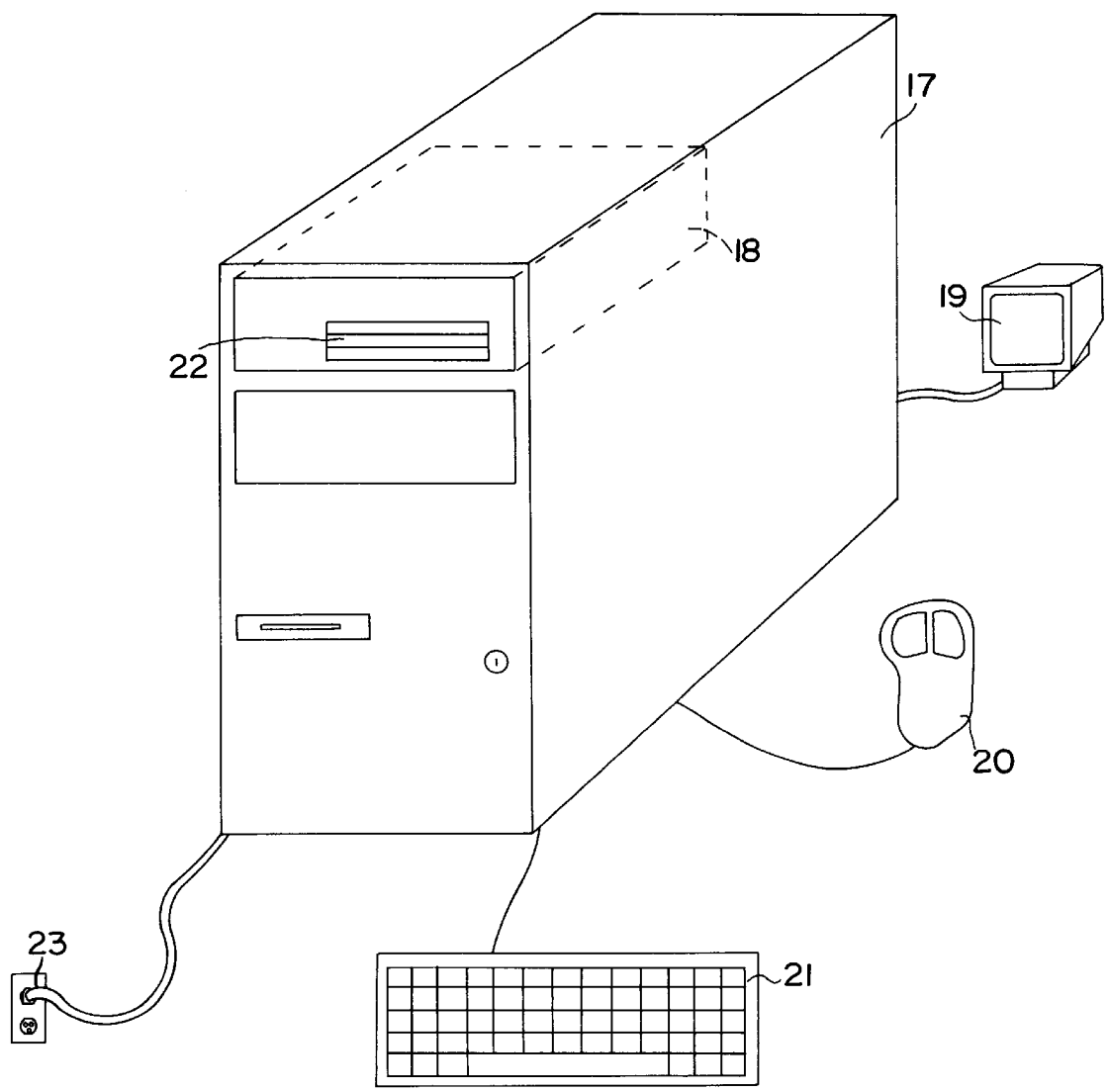
FIG. 3 is a front perspective view of a structure of this invention wherein a desktop computer is used with a removable or detachable Mobile Assistant® unit.

In FIG. 3, a desktop base computer 17 is shown having therein a removable-detachable Mobile Assistant® 18 minus display means and power means. The Mobile Assistant® and the base computer 17 may both be self-contained, i.e., both contain all of the necessary computer components. In other embodiments, at least one unit, either base computer 17 or Mobile Assistant® 18 (core computer) may contain all or some necessary computer components, and the remaining or shell unit will have remaining components and wireless or other communication means to operate the shell unit. The desktop computer 17 has a monitor or display means 19 that may be a conventional monitor or may be a removable monitor with means to adapt it for use as display means for the detachable mobile computer 18. The same is true of mouse controls 20 or keyboard 21; they may be a conventional mouse control and keyboard or they may be removable from base unit 17 and may have means to adapt for use with the detachable mobile computer 18. The mobile computer 18 may be used with the head set and activation means described in Ser. No. 08/538,194 or may be used with adaptable components 20 or 21 of base unit 17. The mobile computer 18 also may contain PCMCIA means 22 and other external connection means. The base computer 17 may contain floppy disk means and other external connection means. The base computer 17 may be powered by AC power means or a battery power source as its power source 23.

Figure 4:
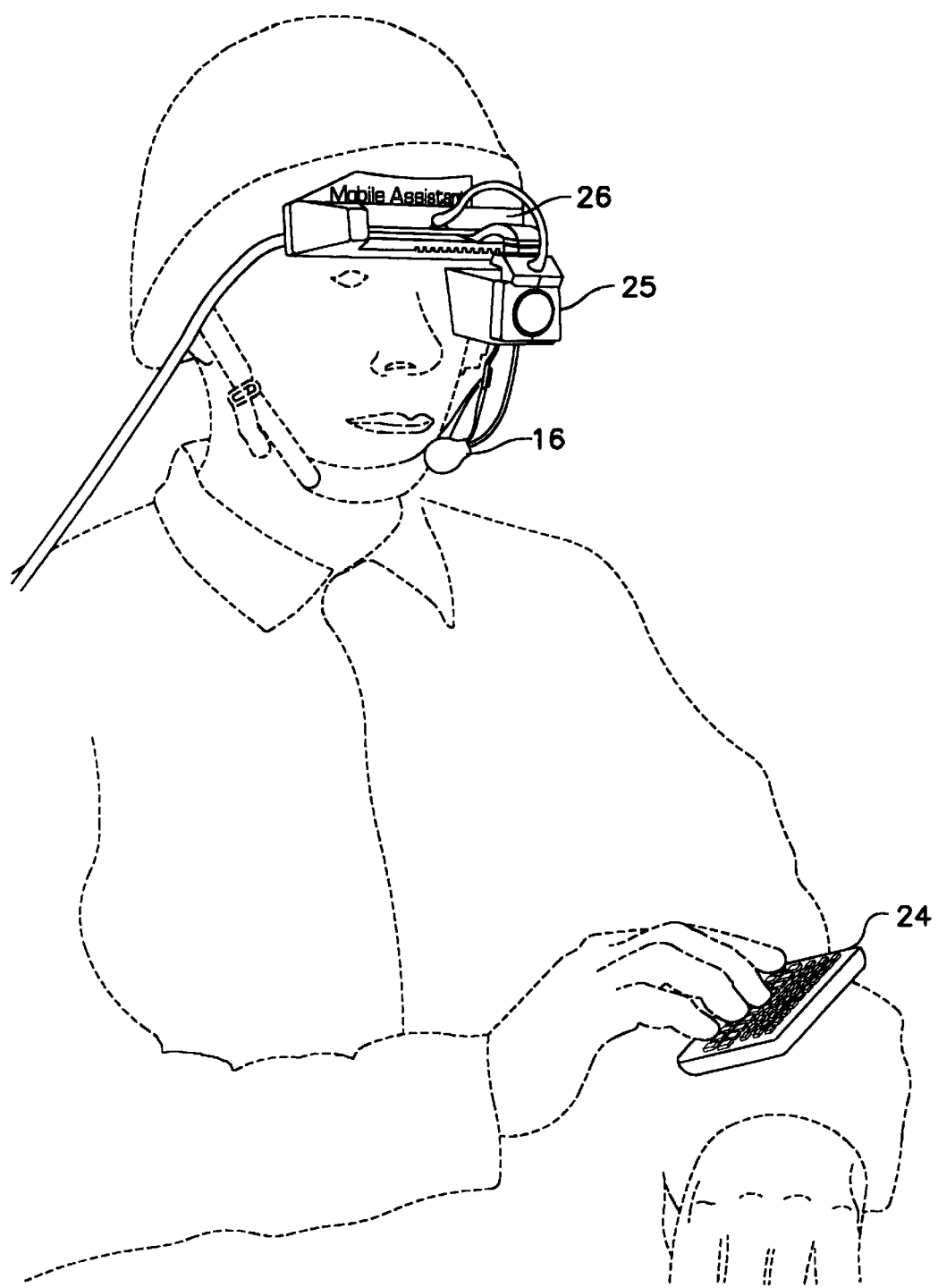
FIG. 4 is a front perspective of a user wearing an optionally detachable monitor and optionally detachable keyboard activation means after removal of the detachable mobile computer unit from the base computer.

In FIG. 4, the optional removable keyboard 24 and the optional removable monitor or display 25 are shown having means for attachment to a user's body. The keyboard 24 is shown attached to the user's arm; however, it can be attached to the user in any other desirable manner, as can any of the other activation means of this invention. The monitor or display 25 in FIG. 4 is shown as a headset; however, it also can be a monitor attached to the user's arm or to any other desirable part of the body. The activating means 16 is shown in FIG. 4 as part of the headset 26, but it also can be attached to any desirable part of the user. All of these components, keyboard 24, display or monitor 25 and activation means 16 can be designed so that they can be used interchangeably on a mobile computer 10 or stand alone base computer 17. All mobile computer components 24, 25 and 16 must have means for attachment to a user's body preferably that permit a hands-free operation of computer 10. The hands-free activation means for the detachable body-worn computer of this invention are those hands-free activation means disclosed in earlier mentioned U.S. application Ser. No. 08/538,194. Even with keyboard 24, after the input is completed, the computer 10 is operated in a hands-free manner.

In all embodiments of this invention, the activation means and display or monitor means may be removable or optionally can stay with the base computer and new activation means (same or different than on base computer) and new monitor means may be used. Communication means such as wireless, radio, cellular phone or any other known or later developed means may be used in both the removable mobile computer and base computer so they may communicate with each other after detachment of the mobile unit therefrom.

The preferred and optimumly preferred embodiments in the present invention have been described herein and shown in the accompanying drawings to illustrate the underlying principles of the invention but it is to be understood that numerous modifications and ramifications may be made without departing from the spirit and scope of this invention.

What is claimed is:

1. A computer system comprising a power source and a base computer with a detachable body-worn mobile computer unit (when detached) that has means to fully function apart from or in conjunction with said base computer, said mobile computer unit comprising hands-free activation means and comprising in a single housing the components of a general purpose computer, said mobile computer unit comprising hands-free activation means selected from the group consisting of audio activation means, brain activation means, eye-tracking means, and mixtures thereof and means for attachment to a user's body, said base computer having means to permit full functioning of said base computer before or after said mobile computer unit is detached therefrom.

2. A computer system comprising a power source and a base computer with a detachable body-worn mobile computer unit, said mobile computer unit has a CPU that is continuously completely active and has means to fully function apart from or when docked in said base computer, said mobile computer unit comprising hands-free activation means and comprising all of the components of a general purpose computer including a CPU, said mobile computer unit comprising hands-free activation means selected from the group consisting of audio activation means, brain activation means, eye-tracking means, and mixtures thereof and means for attachment to a user's body, said base computer, and said mobile computer unit both being general purpose computers and having means to permit full functioning of both computers while connected or after said mobile computer unit is detached from said base computer, both said base computer and said mobile computer comprising their own separate processor means, memory means, activation means, internal storage means and display controller means.

3. The computer of claim 2 wherein said hands-free activation means comprises a voice-activation means.

4. The computer system of claim 2 wherein a monitor of said computer system is removable.

5. The computer system of claim 2 wherein said power source is an electrical source such as AC current or a battery.

6. The computer system of claim 2 wherein said mobile computer unit comprises a self-contained computer means.

7. The computer system of claim 2 wherein said detachable body-worn mobile computer and said base computer have means to communicate with each other when said detachable body-worn mobile computer is detached and removed from said base computer.

8. The computer system of claim 2 wherein said detachable body-worn mobile computer has voice activation means and means for attachment to a body-worn display means.

\* \* \* \* \*